Jan. 7, 1930.  K. E. KNUTSSON  1,742,655
ANTISKID CHAIN
Filed Dec. 3, 1927
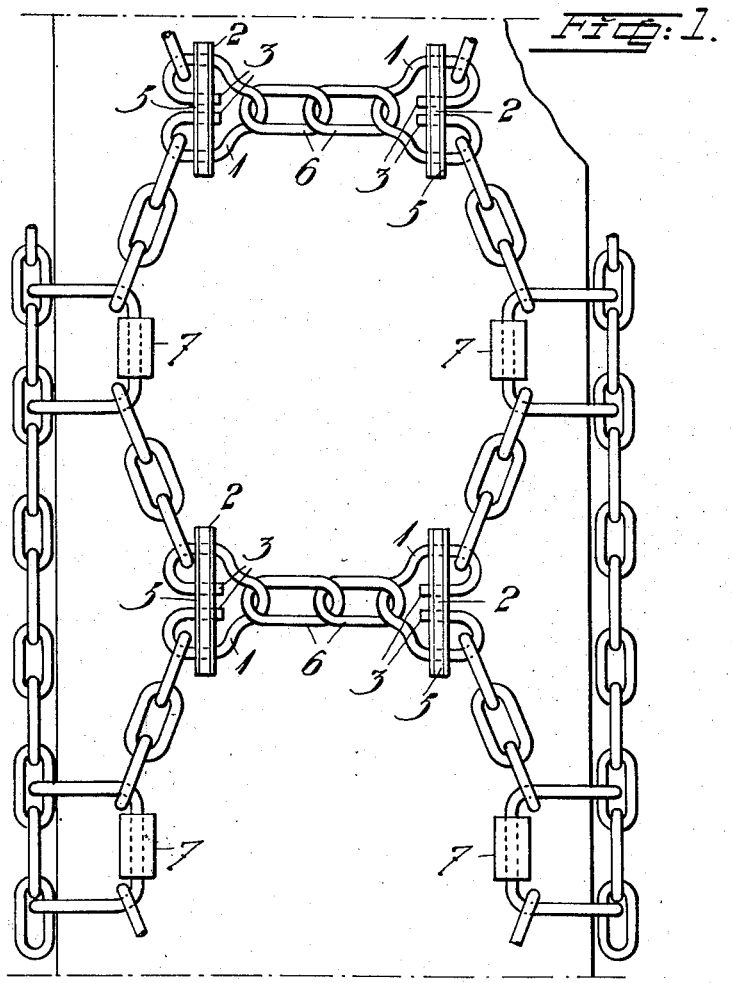
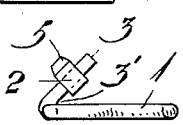 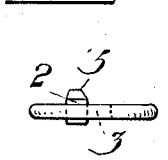 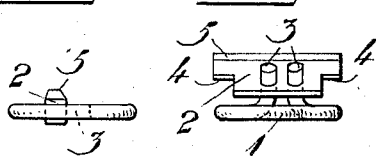
Inventor
Karl E. Knutsson Patented Jan. 7, 1930

1,742,655

UNITED STATES PATENT OFFICE

KARL EMANUEL KNUTSSON, OF ARBRA, SWEDEN, ASSIGNOR TO AMANDA JOHANSSON, OF STOCKHOLM, SWEDEN

ANTISKID CHAIN

Application filed December 3, 1927, Serial No. 237,526, and in Sweden December 7, 1926.

The present invention relates to a link adapted for joining the transverse chain links of anti-skid snow chains or similar devices, this link consisting partly of an annular or clamp shaped portion whose two ends or shanks are turned back towards the transverse part, and partly of a rectangular portion with holes or similar apertures in which the said turned-back ends are placed, one in each hole.

One form of construction of the invention is shown in the accompanying drawings, in which:

Fig. 1 shows the link used in a snow chain; and

Figs. 2, 3 and 4 show the link separately, viewed from two sides at right angles to each other, in Figs. 2 and 3 with both ends of the same in a turned-up position, and in Fig. 4 in a depressed position.

Referring to the drawings 1 designates the clamp-formed part and 2 the rectangular portion of the link equipped with two holes. The two ends 3 turned back towards the transverse part are introduced into their respective holes in part 2, so that part 2 rests against a lug 3¹ formed by a bend upon the ends 3. The rectangular portion 2 which, according to the form of construction shown, extends across the entire clamp-shaped portion 1, is provided with two notches or recesses 4 (Fig. 3), which enable the clamp-shaped portion to be depressed in such a manner that its free ends 3 will be on the same level as the shanks as a whole. In this case, the latter are made to rest against the bottom of the respective notch or recess, rendering it impossible for the rectangular portion 2 which, with one of its edges grips the road surface, to be depressed into the tread of the cover. The rectangular portion in the edge intended for gripping the road surface is provided with an edge 5 in order to strengthen the grip.

When it becomes necessary to replace the transverse links 6 of the snow chain, the ends 3 of the clamp-shaped portion are turned upward into the position shown in Figs. 2 and 3, after which the rectangular portion 2 is removed. Thereupon the chain links inserted in the link can easily be extracted from the same.

Several different forms of constructions are contemplated coming within the scope of the invention. Thus, for example, part 1 may be annular or formed in some other suitable manner; likewise part 2 may be constructed in a number of different ways without departing from the fundamental principle of the invention. 7 are rollers for protecting the rubber tire against wear and tear resulting from the motion of the chain while it is being driven.

What I claim is:

A link for connecting the ends of a cross chain to the side members of an antiskid chain for a wheel of an automotive vehicle, comprising a substantially U-shaped member having the ends of its arms bent rearwardly toward its transverse portion, and a plate of greater length than the width of said U-shaped member, said plate having apertures to receive the ends of the arms of said U-shaped member and having one edge cut away at each of its ends to form a portion adapted to enter between, and portions adapted to overlie the inbent parts of the arms of said U-shaped member when the bent portions of said arms are bent into the same plane as the body of said U-shaped member.

In testimony whereof, I have signed my name to this specification at Stockholm, Sweden, this 13th day of May, 1927.

KARL EMANUEL KNUTSSON.